United States Patent [19]
Clerke

[11] Patent Number: 4,780,862
[45] Date of Patent: Oct. 25, 1988

[54] BOREHOLE TELEVIEWER

[75] Inventor: Edward A. Clerke, Missouri City, Tex.

[73] Assignee: Shell Oil Company, Houston, Tex.

[21] Appl. No.: 931,103

[22] Filed: Nov. 17, 1986

[51] Int. Cl.$^4$ .......................................... H04R 17/00
[52] U.S. Cl. .................................. 367/166; 367/35; 367/171; 181/402
[58] Field of Search ................. 367/25, 35, 152, 166, 367/171; 181/106, 402; 364/422; 141/5, 7

[56] References Cited

U.S. PATENT DOCUMENTS

| | | | |
|---|---|---|---|
| 3,369,626 | 2/1968 | Zemanek, Jr. ................ | 367/68 X |
| 3,478,839 | 11/1969 | Zemanek, Jr. ................ | 367/55 |
| 3,961,305 | 6/1976 | Green .......................... | 367/171 |
| 4,188,609 | 2/1980 | Mott ............................ | 367/166 |
| 4,382,290 | 5/1983 | Hauira ........................ | 367/35 |
| 4,567,921 | 2/1986 | King ........................... | 141/5 |
| 4,596,903 | 6/1986 | Yoshizawa ................... | 367/171 X |
| 4,704,708 | 11/1987 | Dennis ......................... | 367/25 |

Primary Examiner—Thomas H. Tarcza
Assistant Examiner—Tod R. Swann

[57] ABSTRACT

A borehole televiewer uses an acoustic fluid which is lubricating, non-toxic, thermally conductive, electrically insulating, non-reactive, tolerant of high temperatures and pressures, impedance-matched to that of the borehole fluids and the tool window, and which has a low kinematic viscosity at low temperatures.

19 Claims, 1 Drawing Sheet

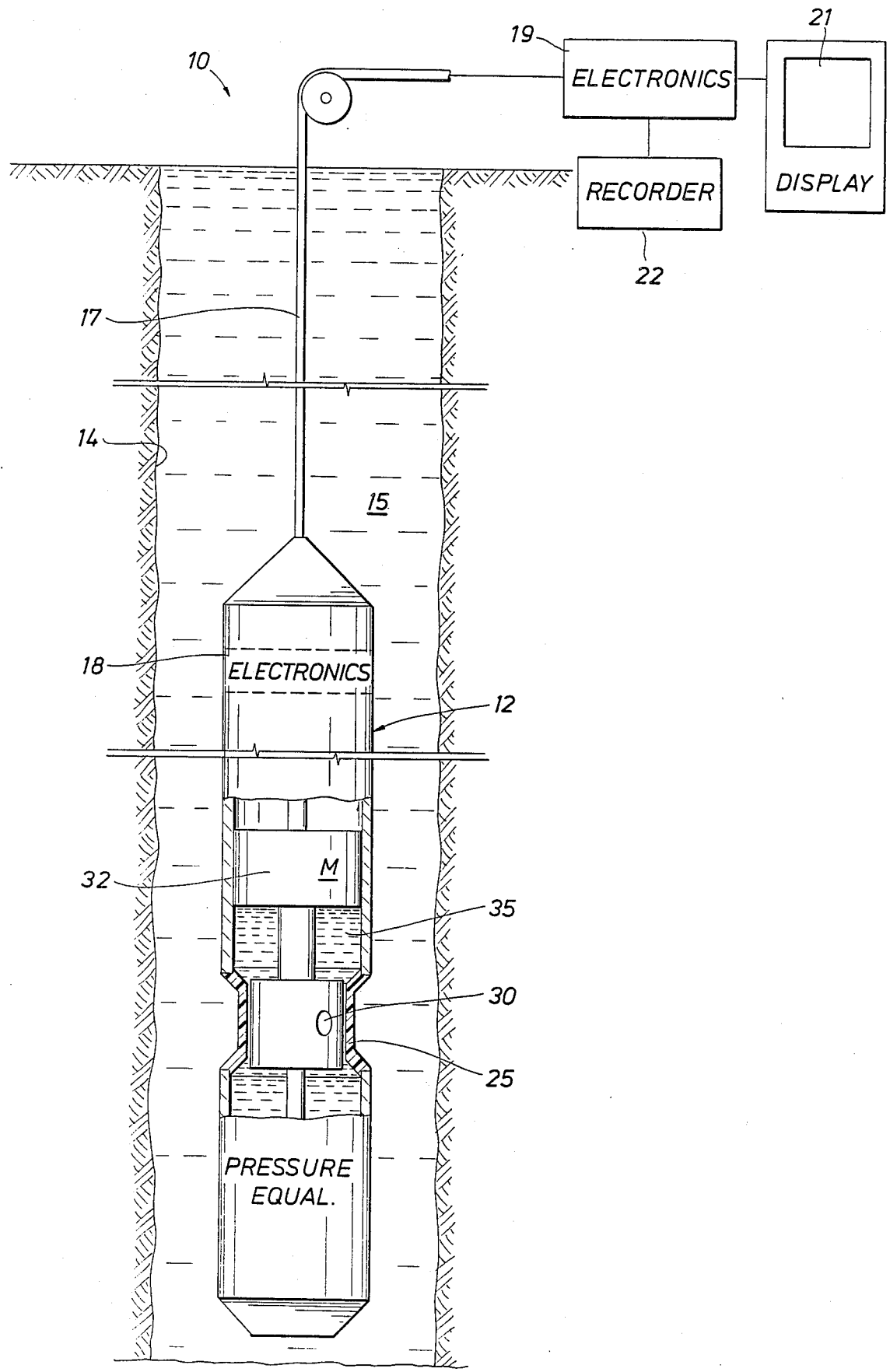

BOREHOLE TELEVIEWER

BACKGROUND OF THE INVENTION

The present invention relates to well logging, and in particular to improvements in a borehole logging tool referred to as a borehole televiewer, or BHTV. Tools of this type are described, for example, in U.S. Pat. No. 3,369,626 (Zemanek, Jr., issued Feb. 20, 1968), U.S. Pat. No. 3,478,839 (Zemanek, Jr., issued Nov. 18, 1969), U.S. Pat. No. 4,463,378 (Rambow, issued July 31, 1984), and U.S. Pat. No. 4,601,024 (Broding, issued July 15, 1986).

In general, borehole televiewer logging tools operate acoustically by periodically pulsing a rotating acoustic transducer to emit a sequence of acoustical pulses directionally into the borehole toward the borehole wall, and analyzing the echos which are reflected back to the tool. The amplitude of the reflected signal may then be displayed on a cathode ray tube, the display sometimes being photographed for future reference. Typically, the display represents a map of the borehole wall split along the north direction and laid out flat. Alternatively, a polar display may be produced, in which case the radius of the circular trace is determined by the time-of-flight of the acoustic pulse, thus presenting a cross-sectional profile of the borehole. Another display, similar to the amplitude display, is modulated by the time-of-flight signal rather than the amplitude signal. The latter can be converted into a pseudo-three-dimensional image by adding a slight bias to the vertical sweep according to the magnitude of the time-of-flight signal. BHTV tools typically include means for monitoring the tool orientation within the borehole, such as a fluxgate magnetometer rotating in unison with the transducer. A good technical description of a borehole televiewer suitable for use in a geothermal environment may be found in "Development of a Geothermal Acoustic Borehole Televiewer", by Fred B. Heard and Tom J. Bauman, Sandia Report SAND83-0681, August 1983.

One of the principal and extremely valuable benefits furnished by the BHTV logging tool is the pseudo "visual" image of the borehole wall which it furnishes. Subtleties in the formation, bedding, bedding planes, dip, and so forth, can be observed and studied in a manner unavailable elsewhere. Especially in the oil industry, conventional optical viewing devices do not suffice, in part due to the typically extremely hostile environment, but primarily because the fluid medium in the borehole is normally opaque to optical energy.

As shown in the above-noted publications, borehole televiewers scan radially, typically with a single transducer, essentially looking at a small ring encircling the transducer in the transverse plane thereof. As the borehole televiewer is then moved vertically through the borehole, the path or trail of this ring, as it moves along the borehole wall, in turn describes the wall. This description is then accumulated to generate the displays discussed above.

As will be appreciated, there is with this type of tool, as with most logging tools, the ever-vexing problem of logging speed versus resolution. Logging operations typically need to be accomplished "as quickly as possible", because drilling operations for the borehole which is being logged must be suspended for most logging operations. Such periods of interrupted drilling are very costly and must be kept as brief as possible. This well-recognized problem is addressed, for example, in the above-noted U.S. Pat. No. 4,601,024 (see Col. 10, lines 37–44), which then offers a solution: multiple transducers simultaneously scanning the borehole wall.

Another, and (at first appearances) very much simpler solution is simply to rotae the acoustical transducer faster. The speed of rotation is determined by considering the spot size of the acoustical signal (about ⅛ inch in an 8–10 inch borehole), the pulse rate (e.g., 1500 pulses per second), the rate of rotation (e.g., 3 rps), and the vertical logging rate (e.g., 300 feet per hour), such that substantially 100% of the borehole wall is covered. Three revolutions per second has been a common speed in some tools for a number of years, and more recently tools have been introduced having a speed of six revolutions per second. Due to the small radial dimensions of the borehole and the limits to the resolution attainable by the acoustical transducer itself (the size of the reflected acoustical energy "spot" having finite dimensions), rotational rates for the transducer could be very substantially increased with no loss of resolution from acoustical effects. (There could be a loss of borehole coverage, however, depending upon these parameters and the borehole size.)

That being the case, there remains the question why speeds have not been increased. Data transmission rate limitations could eventually impose limits, but data rates at these speeds are well below saturation. Rather, the major problems have been mechanical. In particular, the viscosity of the fluid, typically motor oil or brake fluid, in which the rotating transducer is bathed becomes a significant limiting factor when rotational speeds are increased.

More particularly, due to the extreme pressures encountered in a borehole, the space surrounding the transducer is filled with liquid rather than air, since air would be too compressible and too attenuating. Due to the extreme operating conditions, this transducer liquid must be rather special. It must provide lubricating properties, should preferably be inexpensive, non-toxic, thermally conductive, electrically nonconductive, non-reactive with borehole televiewer components which it contacts, and it must be tolerant of borehole operating temperatures (high boiling point, e.g., above approximately 300° F.–350° F.) and pressures. It has been found that certain motor oils and brake fluids, as mentioned, meet many of these requirements fairly well.

However, it has also been found, although it is believed that this is not yet recognized in the industry, that the acoustic impedances of such motor oils and brake fluids are very poorly matched to the acoustical window materials used in at least one of the more advanced BHTV tools, and the elastomeric transducer backing material. That is, a portion of the outer body of the tool or sonde housing is typically made of a material substantially transparent to the acoustical energy (pulses) being bounced off the borehole wall. In the ideal situation, the acoustical impedance of the window material substantially matches that of the fluid (drilling mud) in the borehole, and the acoustical impedance of the acoustical fluid surrounding the transducer within the tool matches that of the acoustical window material. Although such an acoustical fluid has been identified and used for several years by the assignee of the present invention, it is believed that other practitioners in this art have not successfully utilized such a fluid.

The acoustical fluid so identified and used is a commercially available synthetic heat transfer fluid, a modified terphenyl, which is available from the Monsanto Company under the registered trademark "Therminol 66"®. It has an acoustic impedance $\rho C = 1531$ kilorayls. The material used for the window by the assignee of the present invention, also believed to be otherwise unknown to practitioners in this art, has been polymethylpentene, which has an acoustic $\rho C = 1820$ kilorayls. This is a good match to that of typical borehole fluids (1700–2300 kilorayls).

Acoustically and otherwise, Monsanto's Therminal 66 has worked well in this capacity as the acoustic fluid for coupling the acoustic pulses from the enclosed transducer to the borehole fluid, through the window material in the tool housing. Therminal 66 ® is also advantageously non-conductive, lubricating to the moving parts in the tool, and has pressure-dependent flashpoints and boiling points which are beyond the range of normal tool operation. It has a density of 1 g/cc and a sound velocity of 1531 m/sec. Unfortunately, however, it also has a relatively high viscosity at low operating temperatures (approximately 500 cSt at 4° C.). This problem is alleviated somewhat when the oil warms after the televiewer is lowered into the borehole.

However, testing of the tool at the well site before logging is often performed at surface temperatures below the operating temperature range of the mechanical section. The oil must then sometimes be preheated to lower the kinematic viscosity. Otherwise, damage to parts such as the precision speed reducer or other drive components may result from such cold start tests. Faster rotational speeds then become impractical, limited by the motor power consumption and the motor's maximum available torque. Torque load, power consumption, and resultant motor heat generation go up exponentially with increases in viscosity and rotational speed, possibly requiring a larger drive motor and gear drive assembly. Since space and power in logging tools are almost always at a premium, and certainly so with borehole televiewers, it can be appreciated why rotational speeds have remained so low.

A need therefore remains for such a borehole televiewer acoustical fluid which retains desirable acoustical and physical properties of fluids such as Therminol 66 ®, but which has a materially reduced kinematic viscosity over the full normal temperature range of tool operation.

SUMMARY OF THE INVENTION

Briefly, the present invention meets the above needs and purposes with the use of a new acoustical fluid, generically identified as ethylbenzene, benzylated, $(CH_3CH_2)$—$C_6H_{5-n}$—$(CH_2$—$C_6H_5)_n$, n = 1, 2, and 3. It is available commercially from the Monsanto company under the trademarked name "Therminol 60" ®. Therminol 60 ® has similar acoustical properties to Therminol 66 ® (a density of 0.998 g/cm³ and a sound velocity of 1515 m/sec). It also is lubricating, basically non-toxic, thermally conductive, electrically non-conductive, non-reactive with borehole televiewer components, has a high boiling point (e.g., above hostile borehole temperatures of about 350° F.), and is quite tolerant of borehole operating temperatures and pressures. In addition, it has a marked decrease in low temperature viscosity: 13.5 cSt at 4° C.

The present invention thus provides a borehole imaging apparatus having a housing movable within an earthen borehole. Typically, the housing, or sonde, is divided into several portions, one of which contains an acoustic transducer for emitting and receiving acoustic energy into and out of the borehole. To facilitate transmission and reception of that acoustic energy, commonly in the form of pulses, through the wall of the sonde, and to reduce energy loss in the acoustic signal, an acoustic window is located in the housing wall adjacent the acoustical transducer. In order to scan the borehole wall, the transducer is typically mounted for movement within the sonde, and in the preferred embodiment, is supported and connected to a drive motor for rotating around the longitudinal axis of the sonde so that the beam of pulses generated by the transducer is swept radially around the borehole.

To minimize acoustic energy losses, the acoustic energy generated by the transducer is coupled into the fluid in the borehole by an acoustic fluid having an acoustic impedance which minimizes acoustic energy losses. The acoustic fluid also has a low kinematic viscosity which supports high speed rotation of the transducer without excessive viscous drag, mechanical energy losses, and loads on the drive motor. In the preferred embodiment, the acoustical window has an acoustic impedance which is a close match to that of the fluid, typically a drilling mud, which fills the borehole. Then, by using an acoustic fluid having a similar acoustic impedance (and a window with a like acoustic impedance), energy losses (e.g., reflections at the fluid/window interfaces) are minimized.

The acoustic fluid typically fills the region surrounding the transducer, so that, due to its incompressibility, it can balance the very high pressures encountered in the borehole. For this reason, the acoustic fluid has additional important properties rendering it compatible with the borehole imaging function. That is, it is a fluid which is lubricating, thermally conductive, electrically non-conductive, non-reactive with borehole televiewer components in contact therewith, and tolerant of borehole operating tempertures and pressures. Preferably, the fluid will have an acoustic impedance in the range of about 1400 to 2000 kilorayls at 22° C., and a kinematic viscosity less than substantially 15 cSt at 4° C.

It is therefore an object of the present invention to provide an improved borehole imaging method and apparatus; such a method and apparatus in which acoustic energy is generated in a borehole and coupled into the fluid in the borehole through an acoustic fluid having a low kinematic viscosity and an acoustic impedance which minimizes acoustic energy losses; in which acoustic energy reflected from the borehole is detected and measured; in which an acoustic image of the borehole is then determined from the reflected acoustic energy; in which a suitable acoustic transducer may be supported in a housing movable within the borehole, for transducing acoustic energy emitted into the borehole; in which such an acoustic fluid may be located in a portion of such a housing for acoustically coupling the transducer to fluid in the borehole; and to accomplish the above objects and purposes in an inexpensive, highly versatile, uncomplicated, efficient, and highly reilable method and apparatus readily suited to the widest possible utilization in borehole imaging.

These and other objects and advantages of the invention will be apparent from the following description, the accompanying drawings, and the appended claims.

BRIEF DESCRIPTION OF THE DRAWING

The drawing FIGURE is a somewhat figurative, partially broken-away illustration showing a borehole imaging apparatus according to the present invention located within a borehole.

DESCRIPTION OF THE PREFERRED EMBODIMENT

With reference to the drawing, the new and improved borehole imaging apparatus, and the method for imaging a borehole therewith, according to the present invention, will be described. A borehole televiewer system 10, including a downhole sonde having a housing 12, is positioned in a borehole 14 filled with a fluid drilling mud 15. The sonde housing 12 is supported in borehole 14 by a conventional logging cable 17. Cable 17 provides both physical support for moving the sonde vertically within borehole 14, and also is a communications link between the electronic package 18 located in housing 12 and the surface electronics 19 located at the top of borehole 14. System 10 may also include a suitable display unit 21, such as a CRT display, and a recorder such as a video recorder 22.

Around the periphery of housing 12 is an acoustic window 25 made of a material, such as polymethylpentene, which is durable and tolerant of the extremely demanding conditions encountered in borehole logging. Window 25 also has an acoustic impedance closely matching that of typical borehole fluids such as the drilling mud 15 located in borehole 14.

Within housing 12, and mounted for rotation on the longitudinal axis of the housing, is an acoustic transducer 30. Driven by a drive motor 32, the transducer 30 then sweeps radially around the housing 12, projecting acoustic pulses outwardly through acoustic window 25 and receiving reflections back from the wall of the borehole 14. The portion of the housing 12 in which the acoustic window 25 is located is filled with an acoustic fluid 35, such as an incompressible liquid, rather than atmospheric air. In the preferred embodiment, the acoustic fluid is a synthetic liquid oil, such as ethylbenzene, benzylated, $(CH_3CH_2)$—$C_6H_{5-n}$—$(CH_2$—$C_6H_5)_n$, n=1, 2, and 3. It is available commercially, for example, from the Monsanto Company under the trademarked name "Therminal 60" ®, as mentioned earlier. When used in borehole imaging applications such as described herein, this fluid is advantageously lubricating, essentially non-toxic, thermally conductive, electrically non-conductive, non-reactive with borehole televiewer components which are in contact with it, tolerant of (i.e., substantially unaffected by) borehole operating temperatures and pressures, and of particular value, it has an acoustic impedance of about 1550 kilorayls at 22° C. and a low kinematic viscosity of about 13.5 cSt at 4° C. Since the acoustic impedance of the polymethylpentene window 25 is around 1820 kilorayls, and that of typical borehole fluids 15 is in the range of 1700-2300 kilorayls, the acoustical impedance match is excellent. Substantial energy savings and efficiencies are also achieved with the present invention due to the significantly reduced kinematic viscosity over that of the previously used fluid which had such desirable acoustical properties. For example, as compared with the above-mentioned previously used modified terphenyl synthetic heat transfer fluid (available from Monsanto Company under the trademarked name "Therminol 66" ®), a borehole imaging apparatus according to the present invention required 40% less power to the drive motor 32 during a cold start at 70° F., and allowed higher speed rotation. The advantages of the present invention are thus readily apparent.

As will be seen, therefore, the present invention represents a significant improvement over the prior art. By combining excellent operating characteristics (non-reactivity, lubricity, temperature and pressure tolerance, etc.) with optimum acoustical properties and low kinematic viscosity, the present invention provides the highest efficiency in transmitting and receiving the acoustical energy, with minimum losses, minimum noise due to unnecessary reflections of that energy at the window/liquid interfaces, and the added ability to rotate the transducer at significantly higher speeds without incurring energy/drag penalties within the sonde. The present invention thus meets the major objectives of the prior art, such as that sought by the U.S. Pat. No. 4,601,024 patent mentioned earlier, but without the attendant complexity and cost of multiple transducers.

What is claimed is:

1. A borehole imaging apparatus, comprising:
   a housing movable within a borehole;
   at least one acoustic transducer supported in said housing for transducing acoustic energy in such a borehole; and
   an acoustic fluid in at least a portion of said housing for acoustically coupling said transducer to fluid in the borehole, said acoustic fluid having a low kinematic viscosity substantially less than 50 cSt at 4° C., and having an acoustic impedance which minimizes loss of said acoustic energy passing through said housing.

2. The apparatus of claim 1 wherein said acoustic transducer provides acoustic energy.

3. The apparatus of claim 2 wherein said acoustic transducer also detects acoustic energy.

4. The apparatus of claim 1 wherein said acoustic transducer detects acoustic energy.

5. The apparatus of claim 1 wherein said acoustic fluid has an acoustic impedance substantially matching that of the fluid in the borehole.

6. The apparatus of claim 5 wherein said acoustic fluid has an acoustic impedance substantially in the range of 1400 to 2000 kilorayls at 22° C., and a kinematic viscosity less than substantially 15 cSt at 4° C.

7. The apparatus of claim 1 wherein said acoustic fluid further comprises a lubricating, thermally conductive, and substantially electrically non-conductive fluid which is substantially non-reactive with components of the imaging apparatus in contact therewith, and stable at borehole operating temperatures and pressures.

8. The apparatus of claim 7 wherein said acoustic fluid further comprises ethylbenzene, benzylated, $(CH_3CH_2)$—$C_6H_{5-n}$—$(CH_2$—$C_6H_5)_n$, n=1, 2, and 3.

9. The apparatus of claim 1 further comprising means supporting said acoustic transducer for movement in said housing.

10. The apparatus of claim 9 further comprising means for rotating said acoustic transducer within said housing.

11. The apparatus of claim 1 further comprising means forming an acoustic window in said housing, and wherein said acoustic fluid is substantially optimized for transmitting said acoustic energy through said window with minimum energy loss.

12. The apparatus of claim 11 wherein said acoustic fluid further comprises a fluid having an acoustic impedance which substantially matches that of said acoustic window.

13. A borehole imaging apparatus, comprising:
   a housing movable within a borehole;

at least one acoustic transducer supported in at least a first portion of said housing for transducing acoustic energy passing between such a borehole and said housing; and an acoustic fluid in said first portion of said housing for acoustically coupling said transducer to fluid in the borehole, said acoustic fluid being substantially non-reactive with components of the imaging apparatus in contact therewith, tolerant of borehole operating temperatures and pressures, having an acoustic impedance substantially in the range of 1200 to 2800 kilorayls at 22° C., and having a kinematic viscosity less than substantially 50 cSt at 4° C.

14. A borehole imaging apparatus, comprising:

a housing movable within a borehole;

means forming an acoustic window in at least a first portion of said housing;

at least one acoustic transducer for emitting and receiving acoustic energy into and out of such a borehole through said window;

support means for rotatably supporting said acoustic transducer in said first portion of said housing;

motor means operatively connected to said acoustic transducer for rotating said acoustic transducer; and an acoustic fluid in said first portion of said housing for acoustically coupling said transducer to fluid in the borehole, said acoustic fluid being lubricating, essentially non-toxic, thermally conductive, substantially electrically non-conductive, substantially non-reactive with components of the imaging apparatus in contact therewith, tolerant of borehole operating temperatures and pressures, having an acoustic impedance substantially in the range of 1400 to 2000 kilorayls at 22° C., and having a kinematic viscosity less than substantially 15 cSt at 4° C., said fluid thereby substantially reducing the torque load on said motor, and being substantially optimized for transmitting said acoustic energy through said window with minimum energy loss.

15. The apparatus of claim 14 wherein said acoustic fluid further comprises ethylbenzene, benzylated, $(CH_3CH_2)-C_6H_{5-n}-(CH_2-C_6H_5)_n$, n=1, 2, and 3.

16. A borehole imaging apparatus, comprising:

mounting means disposable in such a borehole and movable therein and containing an acoustically transparent portion;

at least one acoustic transducer contained in said mounting means for transducing acoustic energy through said transparent portion; and fluid disposed between said acoustic transducer and said transparent portion for coupling acoustic energy between said transducer and said transparent portion, wherein said fluid is stable over surface and borehole temperature and pressure ranges and has a low kinematic viscosity substantially less than 50 cSt at 4° C.

17. A borehole imaging apparatus, comprising:

mounting means disposable in such a borehole and movable therein and containing an acoustically transparent window;

at least one acoustic transducer rotatably mounted in said mounting means adjacent said window for emitting and receiving acoustic energy; and fluid disposed between said acoustic transducer and said window for coupling acoustic energy between said transducer and said window, wherein said fluid is stable over surface and borehole temperature and pressure ranges and has a low kinematic viscosity substantially less than 50 cSt at 4° C.

18. A method for imaging a borehole, comprising:

generating acoustic energy in such a borehole;

coupling the acoustic energy into the fluid in the borehole with an acoustic fluid having a low kinematic viscosity substantially less than 50 cSt at 4° C., and an acoustic impedance which minimizes acoustic energy losses;

detecting and measuring acoustic energy reflected from such a borehole; and determining from said reflected acoustic energy an acoustic image of the borehole.

19. A method for imaging a borehole, comprising:

generating acoustic energy in such a borehole;

detecting and measuring acoustic energy reflected from such a borehole by coupling the acoustic energy from the fluid in the borehole through an acoustic fluid having a low kinematic viscosity substantially less than 50 cSt at 4° C., and an acoustic impedance which minimizes acoustic energy losses; and determining from said reflected acoustic energy an acoustic image of the borehole.

* * * * *